US009771510B2

(12) United States Patent
James et al.

(10) Patent No.: US 9,771,510 B2
(45) Date of Patent: Sep. 26, 2017

(54) SWELLABLE COMPOSITIONS FOR BOREHOLE APPLICATIONS

(71) Applicant: Schlumberger Technology Corporation, Sugar Land, TX (US)

(72) Inventors: Simon Gareth James, Le Plessis-Robinson (FR); Bruno Drochon, Houston, TX (US)

(73) Assignee: SCHLUMBERGER TECHNOLOGY CORPORATION, Sugar Land, TX (US)

( * ) Notice: Subject to any disclaimer, the term of this patent is extended or adjusted under 35 U.S.C. 154(b) by 71 days.

(21) Appl. No.: 14/625,639

(22) Filed: Feb. 19, 2015

(65) Prior Publication Data

US 2015/0252245 A1    Sep. 10, 2015

Related U.S. Application Data

(63) Continuation of application No. 12/989,695, filed as application No. PCT/IB2009/005345 on Apr. 23, 2009, now Pat. No. 8,993,491.

(30) Foreign Application Priority Data

Apr. 28, 2008    (EP) .................................. 08155274

(51) Int. Cl.

| C09K 8/508 | (2006.01) |
| C09K 8/42 | (2006.01) |
| E21B 33/12 | (2006.01) |
| C04B 26/02 | (2006.01) |
| C09K 8/44 | (2006.01) |
| C09K 8/467 | (2006.01) |
| C09K 8/487 | (2006.01) |
| C09K 8/516 | (2006.01) |
| C04B 103/00 | (2006.01) |

(52) U.S. Cl.
CPC ............ *C09K 8/5086* (2013.01); *C04B 26/02* (2013.01); *C09K 8/42* (2013.01); *C09K 8/44* (2013.01); *C09K 8/467* (2013.01); *C09K 8/487* (2013.01); *C09K 8/5083* (2013.01); *C09K 8/516* (2013.01); *E21B 33/12* (2013.01); *C04B 2103/0049* (2013.01)

(58) Field of Classification Search
None
See application file for complete search history.

(56) References Cited

U.S. PATENT DOCUMENTS

| 8,993,491 B2 * | 3/2015 | James ...................... C04B 26/02 507/219 |
| 2008/0142222 A1 * | 6/2008 | Howard ............. B01D 39/1646 166/295 |
| 2011/0098202 A1 | 4/2011 | James et al. |

FOREIGN PATENT DOCUMENTS

CA    2681122    10/2008

OTHER PUBLICATIONS

Examination report for the equivalent Canadian patent application No. 2721703 issued on Apr. 30, 2015.

* cited by examiner

*Primary Examiner* — John J Figueroa
(74) *Attorney, Agent, or Firm* — Andrea E. Tran

(57) ABSTRACT

Compositions that swell on contact with water contain a non-swellable thermoplastic or thermoset polymer and a swellable inorganic compound. In particular, the compositions are suitable for use in subterranean wells such as those used in the oil and gas industry. The polymer may be polypropylene and the inorganic compound may be magnesium oxide.

19 Claims, 3 Drawing Sheets

SWELLABLE COMPOSITIONS FOR BOREHOLE APPLICATIONS

CROSS REFERENCE TO RELATED APPLICATIONS

This is a continuation application of co-pending U.S. patent application Ser. No. 12/989,695, Simon Gareth James, et al., filed on Apr. 23, 2009 under 35 U.S.C. 371 of International Patent Application Number PCT/IB2009/005345, and entitled "Swellable Compositions for Borehole Applications," which claims priority of EP08155274.7 filed on Apr. 28, 2008, and is hereby incorporated in its entirety for all intents and purposes by this reference.

TECHNICAL FIELD

This invention relates to compositions which swell on contact with water. In particular, the invention is suitable for use in subterranean wells such as those used in the oil and gas industry.

BACKGROUND ART

There have been a number of proposals to use swellable materials in oilfield applications for filling voids or blocking off water flows. Most of these are based on the use of elastomers that are capable of swelling on their own accord, as well as swellable compositions that swell after coming into contact with a material that triggers the swelling of a component of the composition. Particulate polymeric materials have also been proposed for use in cement compositions for oilfield applications.

WO 2005/012686 discloses a composition comprising salt particles within a swellable elastomer; the composition swells after water penetrates into the elastomer by osmosis. U.S. Pat. No. 7,059,415 discloses a composition comprising minerals that swell on contact with water but that lose water on heating at a relatively low temperature (e.g. sodium montmorillonite) within an elastomer that swells on contact with oil.

Mineral oxides such as magnesium oxide find a number of uses in the cement and polymer industries. In the composition disclosed in U.S. Pat. No. 7,252,142, the role of magnesium oxide is to form an acido-basic cement with monopotassiumphosphate; in U.S. Pat. No. 7,247,666 magnesium oxide acts as a flame retardant in thermoplastics. U.S. Pat. No. 7,160,949 discloses inorganic fillers, which are preferably platey materials and possibly magnesium oxide, within very specific thermoplastics. Swellable clays are preferred because they can be separated into fine suspensions. Magnesium oxide may also be used as filler in rubber (U.S. Pat. No. 6,737,478), and US 2007/0142531 discloses a cleaning blade for use in image-forming apparatus, whereby the material is an acrylonitrile-butadiene rubber and magnesium oxide is an optional filler. It has to be noted that in this document, the rubber has basically a too strong swelling capacity when subjected to toluene and thus magnesium oxide is used to diminish said capacity.

U.S. Pat. No. 7,228,915, which discloses a device and method to seal boreholes, mentions polyetheretherketone (PEEK) and other materials as a non-swelling layer on top of a swelling elastomer, and discloses that inorganic additives added to the elastomer can delay swelling.

The present invention is based on the fact that the inventors surprisingly found that swelling due to a phase change resulting from hydration of an inorganic component can provide a composition in which swelling can take place reliably even at the high temperatures encountered in borehole uses.

DISCLOSURE OF INVENTION

In an aspect, the invention aims at a swellable composition comprising inorganic material dispersed within a polymer matrix, wherein the inorganic material swells on contact with water due to hydration and phase modification of the inorganic material. The subject compositions typically comprise an inorganic material and a polymer in which the inorganic material is dispersed.

The inorganic part, which can be a mineral filler capable of swelling on contact with water, is preferably a metal oxide, more preferably magnesium oxide (MgO) or calcium oxide (CaO) and mixtures thereof. During the course of their research, the inventors surprisingly found that, contrarily to the prior art statements, the inorganic part promotes the swelling of the subject compositions and thus a synergistic effect is observed.

The polymer can be either a thermoset material or a thermoplastic material and mixtures thereof. In a preferred embodiment, the polymer comprising the polymer matrix is chosen from the list consisting of Polyetheretherketone, polyaryletherketones, polyamides (Nylon 6, Nylon 6.6, Nylon 6.12, Nylon 6.9, Nylon 12, Nylon 11), polycarbonate, polystyrene, polyphenylsulphone, polyphenylene sulphide, polysulphone, polytetrafluoroethylene, polypropylene, epoxy resins, furan resins, acrylonitrile-butadiene rubber, hydrogenated acrylonitrile-butadiene rubber and ethylene propylene diene M-class rubber and mixtures thereof.

In a more preferred embodiment, said polymer is chosen from the list consisting of Polyetheretherketone, polyphenylsulphone, polyphenylene sulphide, polysulphone, polypropylene, acrylonitrile-butadiene rubber, hydrogenated acrylonitrile-butadiene rubber and ethylene propylenediene M-class rubber and mixtures thereof. In a most preferred embodiment, the polymer is at least one of Polyetheretherketone, polyphenylsulphone, polyphenylene sulphide, polysulphone, polypropylene and mixtures thereof. In another preferred embodiment, the polymer is a thermoplastic having at least a glass transition temperature or a melting point above 150° C. In yet an even more preferred embodiment said polymer is PEEK or polypropylene. Polymer with a glass transition temperature or a melting point below 150° C. are less preferred but would be suitable for downhole operation at low temperature; examples of such thermoplastic polymers are polyethylene and polyvinylchloride.

In an embodiment, the polymer does not swell after coming into contact with either aqueous or non-aqueous fluids. In another embodiment, the polymer swells after coming into contact with either aqueous or non-aqueous fluids.

The compositions according to the present invention, are suitable to be used in subterranean wells; then said compositions are preferably capable of swelling after coming into contact with one or more triggers which cause one or more of the components to swell, and can be capable of swelling at temperatures even over 300° C.

In a preferred embodiment, the compositions are formed after the inorganic and organic parts are blended together using for example the extrusion method or batch processing or continuous stirred tank reactors. The blending conditions may be adjusted to produce the appropriate dispersion of the inorganic material within the polymer matrix. The inorganic mineral filler is optionally surface-treated prior to blending with the polymer to improve bonding to and dispersion within the polymer matrix. Within the context of the present disclosure, by "surface-treated" it has to be understood that the inorganic material filler is submitted to a chemical or physical treatment using a treating agent such as for example silane coupling agents, high fatty acids, metal salts of fatty acids, unsaturated organic acids, organic titanates, resin acids or polyethylene glycol. From a more general point of view, the inorganic mineral filler may be, within the context of this embodiment, submitted to treatments such as the ones disclosed in section 6.3 of "Handbook of Fillers—A definitive users guide and databook 2nd edition, George Wypych, Chemtec Publishing 2000.

In a preferred embodiment, the composition is used in layers to assist with the closing of micro-annuli during oilfield operations, or used as layers on the outside of conventional packers/external casing packers (ECPs) to provide extra sealing efficiency during oilfield operations, or used as layers on downhole tools or valves to automatically shut off flow on water arrival during oilfield operations.

The composition may also preferably be used as layers on downhole tools or valves to actuate an electrical or mechanical device during oilfield operations, or incorporated in a screen assembly to provide water flow control during oilfield operations, or coated on screen wrapping to provide water flow control during oilfield operations.

BRIEF DESCRIPTION OF FIGURES IN THE DRAWINGS

MODE(S) FOR CARRYING OUT THE INVENTION

Figure 1:
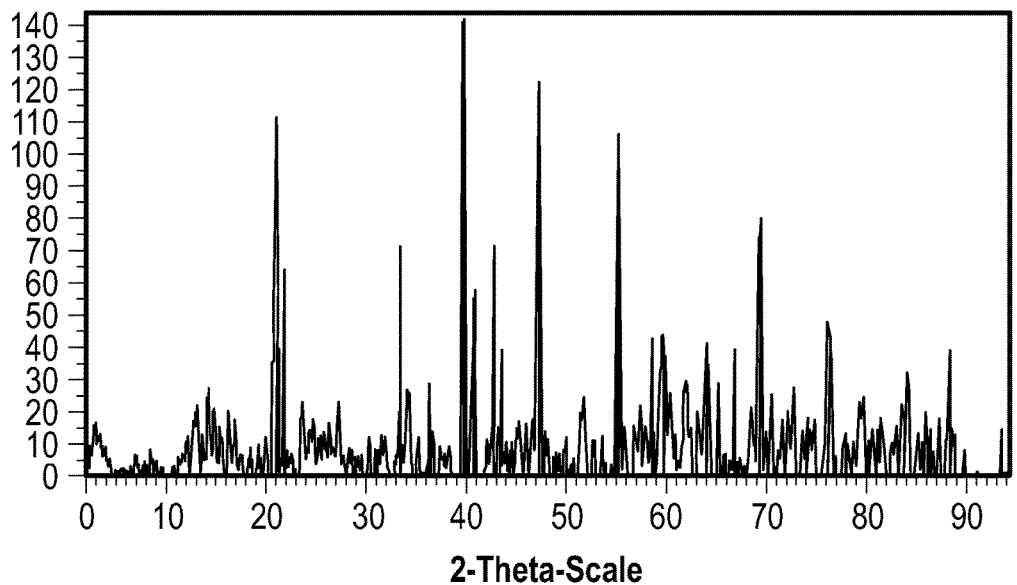
FIG. 1 shows the X-ray diffraction results obtained after subjecting MnO to wellbore conditions.

The selection of the polymer forming the matrix depends on the intended application of the composition. Preferably, thermoplastic polymeric matrices are used, but thermoset materials may also be useful in some applications. In most cases, the thermoplastic polymer must be used at temperatures below its melting temperature (crystalline polymers) or glass transition temperature (amorphous polymers). The polymer should preferably be compatible with the environment in which it is deployed in order to avoid that the polymer loses its properties after coming into contact with fluids during use. In circumstances where a large swelling ratio is required, the polymer is preferably capable of swelling.

The selection of materials comprising the inorganic part is mainly dependent on the ability to provide a sufficient level of size change on contact with water. Preferably, the materials which comprise the inorganic part must be able to hydrate from one stable state to form a second stable state, and therefore typically comprise mineral oxides and their corresponding stable hydrate (i.e. hydroxide). Some suitable mineral oxides and hydroxides are listed in Table 1 below; as they are naturally-occurring in both states, they should provide long-term stability.

TABLE 1

| Oxide | Mineral name | Hydroxide | Mineral name |
| --- | --- | --- | --- |
| MgO | Periclase | $Mg(OH)_2$ | Brucite |
| CaO | Lime | $Ca(OH)_2$ | Portlandite |
| MnO | Manganosite | $Mn(OH)_2$ | Pyrochroite |
| NiO | Bunsenite | $Ni(OH)_2$ | Theophrastite |
| $Zn_{0.9}Mn_{0.1}O$ | Zincite | $Zn(OH)_2$ | Sweetite |
| BeO | Bromellite | $Be(OH)_2$ | Behoite |
| CuO | Tenorite | $Cu(OH)_2$ | Spertiniite |

It has to be noted that some of the mineral oxides and hydroxides listed in Table 1 may not be preferred for all oilfield borehole uses. For example, minerals containing nickel are not normally used for health and environmental reasons, and hydration of some of the other minerals will not occur under normal boreholes conditions but only when subjected to extremely hot environment.

Preferably, magnesium oxide (MgO) is used, although calcium oxide (CaO) is also suitable because CaO also hydrates under normal well conditions and is environmentally acceptable. Mixtures of CaO and MgO may also be used.

MgO can be considered representative of the divalent metal (e.g. Mg, Ca, Mn, Fe, Co, Ni, Cd) oxides. The divalent metal oxides (MO) have a rock-salt structure and their hydroxides $(M(OH)_2)$ have brucite structure (Heidberg, B., Bredow, T., Litmann, K., Jug, K. (2005) "Ceramic hydration with expansion. The structure and reaction of water layers on magnesium oxide. A cyclic cluster study," Materials Science-Poland, Vol. 23, No. 2). The performance of a given oxide can be adjusted by varying its particle size and calcining temperature.

The use of other inorganic materials capable of hydration e.g. $CaSO_4$ may be limited by factors such as temperature and pressure. For example, depending on the pressure, $CaSO_4$ can only be used up to a temperature of around 80° C. to 100° C. because above this temperature range, $CaSO_4$ remains in anhydrite form.

In an embodiment, the composition is used as layers on downhole tools or valves to actuate an electrical or mechanical device during oilfield operations, or incorporated in a screen assembly to provide water flow control during oilfield operations, or coated on screen wrapping to provide water flow control during oilfield operations. An example of such uses might be a valve made with a section of tube with a layer of the composition according to the present invention on its internal diameter; when water passes the layer would swell reducing then said internal diameter and thus reducing or even stopping the flow. Another example could be the use of the swelling behaviour of the composition according to the present invention to activate for example a switch; water when in contact with the composition would provoke swelling which would push conductors into contact thus forming an electrical circuit or at least allow material to be energized. Other uses based on for example the knowledge of U.S. Pat. No. 7,510,011 would be available to the one skilled in the art when aware of the disclosure of the present invention.

EXAMPLE 1

Hydration of manganous oxide (MnO) powder is attempted by placing manganese oxide powder (60-170 US mesh, 99% purity obtained from Sigma-Aldrich) in a solution, of water and calcium hydroxide, inside a drilling fluid hot rolling cell, then pressurising the cell with nitrogen and placing the cell in a rolling oven for one week at 200° C. The cell is next cooled to room temperature, deprssurised and the solids recovered by filtration and dried. Composition of the final product is determined by analysis of the solid residue using an X-ray diffraction technique. FIG. 1 shows the X-ray diffraction results obtained for the hydrated MnO and the manganosite, pyrolusite, portlandite and pyrochroite phases. The results show that the MnO has not hydrated and would therefore not be a suitable additive to provide swelling at temperature below 200° C.; however for boreholes with extremely hot conditions, MnO might be a good candidate.

EXAMPLE 2

MgO hydrates easily in water to form $Mg(OH)_2$. 70 g of MgO (D176) is stirred in 1 liter of water for 1 hour at room temperature using a paddle mixer turning at 325 rpm. After one hour most of the water is decanted off and the sample is then placed in an oven for 72 hours at 105° C. to dry. Once dried, the product is analysed using a thermogravimetric analyzer (TGA) (TA Instruments, TGAQ500) at a heating rate of 10° C./min in a flow of nitrogen.

Figure 2:
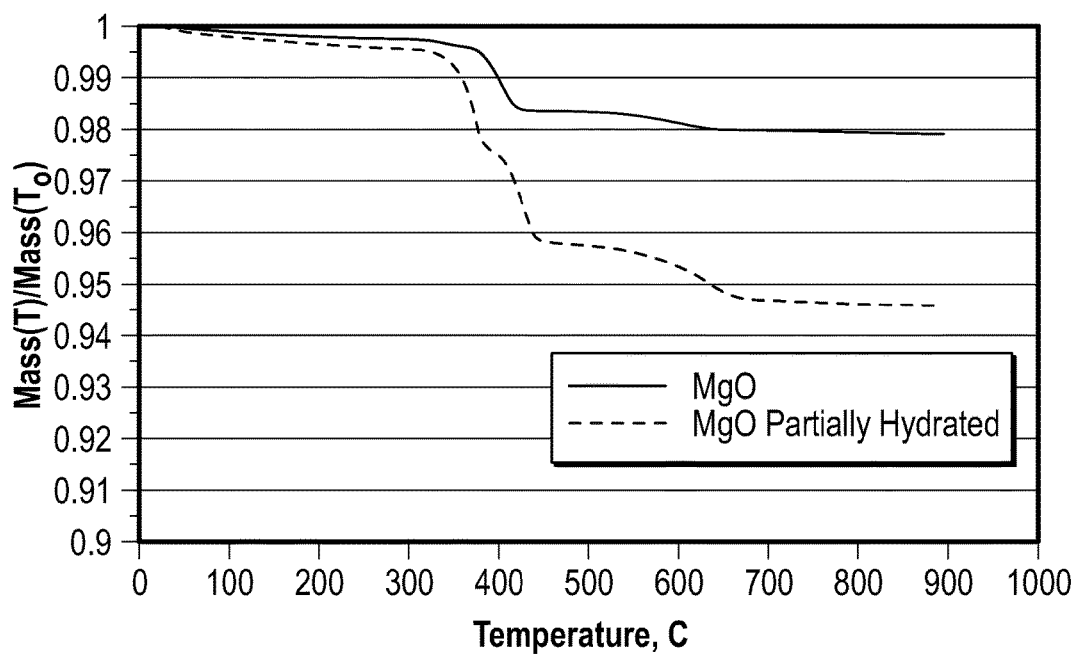
FIG. 2 shows thermogravimetric analyser (TGA) measurements of weight changes between MgO and $Mg(OH)_2$ after hydration and subsequent dehydration and rehydration.

FIG. 2 shows the plots of the TGA measurements for MgO and partially hydrated MgO. The results show that weight loss due to dehydration of the $Mg(OH)_2$ to reform MgO occurs at temperatures above 300° C., and that MgO hydrates partially at low temperatures when in direct contact with water. Complete hydration results in a weight loss of 31% during the thermogravimetric measurements.

EXAMPLE 3

Figure 3:
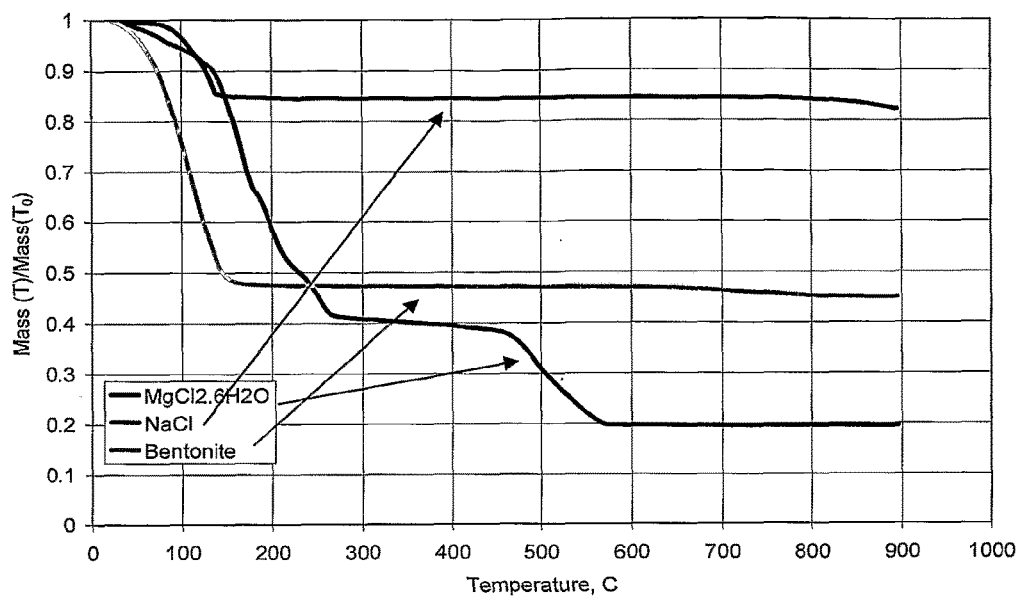
FIG. 3 shows TGA measurements on $MgCl_2.6H_2O$, wet sodium chloride and bentonite paste to determine the temperature at which the water evaporates.

TGA measurements were also performed on a common hydrated salt ($MgCl_2.6H_2O$), wet sodium chloride and a bentonite paste (approximately 50% by weight of water) to determine the temperature at which the water evaporates. The $MgCl_2.6H_2O$ contains approximately 53% by weight of water. The TGA data in FIG. 3 shows that this amount of water is driven from the sample at a temperature range from approximately 75° C. to 270° C. The wet sodium chloride loses all its water by 140° C. The bentonite paste loses all its water by 165° C.

By comparing the results from Examples 2 and 3, it is clear that the tighter the binding of water to a product, the higher the temperature required to dehydrate the product. This is why the use of MgO and oxides similar to MgO is preferred in the present invention.

EXAMPLE 4

The hydration of a metal oxide is given by the equation $XO + H_2O \rightarrow X(OH)_2$ where X is a metal (in this instance, either Ca or Mg). The volume change is calculated from the densities of the initial oxide and final hydroxide, and is listed in Table 2.

TABLE 2

| | Density (g cm$^{-3}$) | |
| --- | --- | --- |
| | Calcium | Magnesium |
| Oxide | 3.35 | 3.78 |
| Oxide mass (1 mole) | 56 g | 40 g |
| Volume | 16.7 cm$^3$ | 10.6 cm$^3$ |
| water | 18 g | 18 g |
| Hydroxide mass | 74 g | 58 g |
| Hydroxide volume | 33.2 cm$^3$ | 24.3 cm$^3$ |
| Volume change | 199% | 229% |

A number of conventional techniques can be used to blend the inorganic and organic part to form the composition. For thermoplastic materials extrusion is preferred, although batch processing, for example using a Banbury mixer, or continuous stirred tank reactors may also be used. A wide range of extruders are available as described in J. L. White, "Twin Screw Extrusion, Technology and Principles," Carl Hanser Verlag, 1991, most of which can be used to blend a filler with a polymer.

In one method the polymeric material and filler are blended together and then fed through a co-rotating intermeshing twin screw extruder to melt-process the polymer and filler together. In another method the filler is added to the molten polymer. In yet another method the filler is added to the feed stock, e.g. caprolactam that subsequently undergoes a reactive extrusion (polymerisation of the caprolactam) to form filled nylon-6. "Mixing and Compounding of Polymers," I. Manas-Zloczower and Z. Tadmore, Carl Hanser Verlag, 1994 describes various other processing methods, including the Banbury mixer. The blending conditions (e.g. temperature, extruder screw design, and rotor speed) can be adjusted to produce the appropriate dispersion of the inorganic material within the polymer matrix.

The swellable mineral filler can be surface treated prior to compounding with the polymer to improve bonding to, and dispersion within, the polymer matrix provided that the treatment does not affect the final swelling properties of the material.

Once blended the composite can be directly injected into moulds or processed into polymer chips for subsequent processing. Various layered materials could be used as long as at least one layer contains the inorganic swelling additive.

EXAMPLE 5

In this example, inorganic fillers are dry blended with polypropylene pellets and the resulting composition fed into a twin-screw extruder. Plaques of the resulting composition are formed, after cryo-grinding the resulting composition to form granules with a particle size of <1 mm, in one of two ways. In the first way, the granules are fed into an extruder and injection-moulded into plaques. In the second way, the granules are placed between platens, of a press, that are heated to above the melting temperature of the polypropylene and then pressed into a film.

The three different fillers used are silica flour (D066 from Schlumberger), Class H cement and MgO (D176 from Schlumberger). The fillers are added at a nominal concentration of 25% by weight of polymer. The density of the base materials and the final processed particles (which are shown in Table 3 below) are measured with a helium pycnometer, thus allowing the final composition of the materials to be determined.

TABLE 3

| | Density (g cm$^{-3}$) | Filler (% mass composite) | Filler (% volume composite) |
|---|---|---|---|
| Polypropylene | 0.9 | — | — |
| Silica flour | 2.65 | — | — |
| Class H cement | 3.210 | — | — |
| Magnesium Oxide | 3.54 | — | — |
| Polypropylene/silica flour composite | 1.008 | 15.5 | 5.9 |
| Polypropylene/class H composite | 1.090 | 23.6 | 8.0 |
| Polypropylene/magnesium oxide composite | 1.089 | 22.7 | 7.0 |

EXAMPLE 6

Pieces of the moulded plaques or pressed film are cut, weighed, and the thickness of the pieces measured in three places before placing the pieces in tap water in glass containers in an oven at 85° C. The samples are periodically removed from the oven and the measurements repeated. All the samples bar one ('pressed film') are injection moulded plaques. Multiple samples of two of the samples are used to determine uniformity of the plaques.

The results show that samples containing silica flour do not expand. The sample containing class H cement does not expand despite the hydration of the cement, indicating that not all hydratable materials swell. The injection moulded plaques with MgO provide up to 12% expansion at the filler loading of 23% by mass of composite. The expansion behaviour of the pressed film sample is similar to that of the injection moulded plaques indicating that the method of preparation of the films is not critical.

EXAMPLE 7

One piece of the moulded plaques with MgO as the filler is weighed and the thickness measured in three places before placement in sodium chloride brine (100 g of NaCl in 400 g distilled water) in glass containers in an oven at 85° C. The sample is periodically removed from the oven and the measurements repeated. The results clearly show that the composite material can swell in brine with a rate similar to that in tap water.

Figure 4:
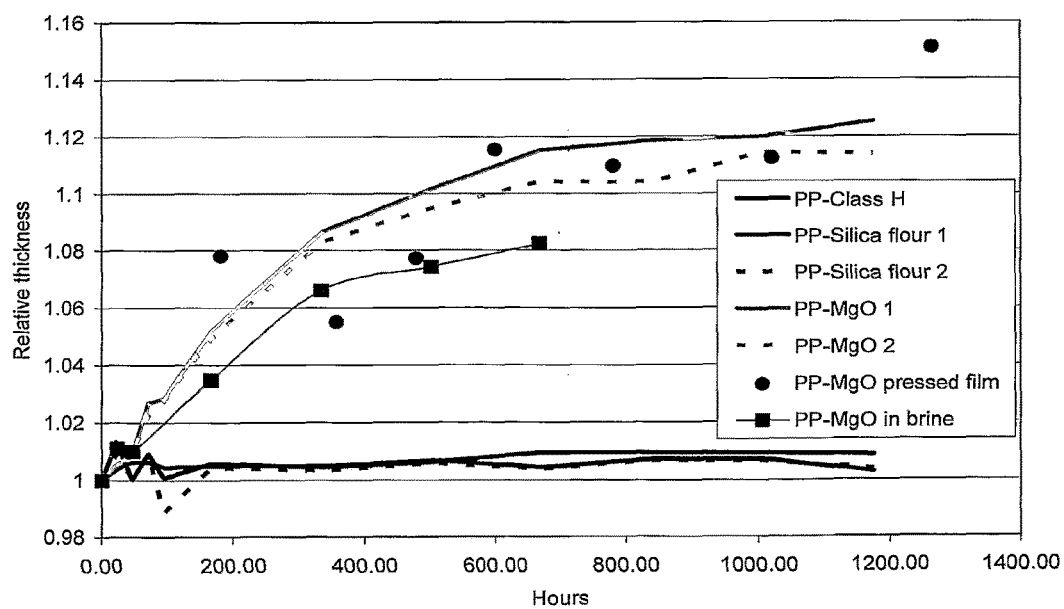
FIG. 4 shows measurement of the thicknesses of pieces of moulded plaques or pressed film after being cut and weighed, before and after hydration and dehydration.

The results of the swelling tests for Examples 6 and 7 are shown in FIG. 4.

EXAMPLE 8

Additional tests were performed using an epoxy resin (example of a thermoset resin) and both CaO and MgO. The epoxy resin was from RS Components, Corby, Northants, UK. The resin was designated unfilled epoxy resin 1122A and the hardener was unfilled epoxy resin hardener 1122B. The magnesium oxide used was Magnesium oxide heavy from Prolabo containing 85% magnesium oxide. The calcium oxide based filler (D174 from Schlumberger) contained 60% CaO and 40% MgO. Non-reactive filler (silica flour) was used as a control system. The formulations tested are given in the table below:

TABLE 4

| System | Resin | Hardener | CaO/MgO | MgO | Silica flour |
|---|---|---|---|---|---|
| A | 6.89 | 8.3g | — | 4.6 g | — |
| B | 6.1 g | 6.1g | 4.1 g | — | — |
| C | 7.3g | 7.1 g | — | 4.2 g | — |
| D | 6.3g | 6.49 | — | — | 4.0 g |

The resin, hardener and filler were weighed into a plastic mould (5 cm×5 cm in area) and then mixed together with a spatula until a homogenous mixture was formed. The quantities used gave a depth of 5.5 to 6.5 mm in the moulds. The resin mixtures were allowed to stand for 30 minutes at room temperature to allow air bubbles to separate as much as possible. The samples were then placed in an oven at 85° C. for 1 hour 15 minutes to cure. Once set the samples were removed from the moulds, weighed, and the volume measured using Archimedes principle. The plaques were then placed in water in a sealed container that was then placed in an oven at 60° C. The samples were removed periodically and the properties of the plaques measured.

Figure 5:
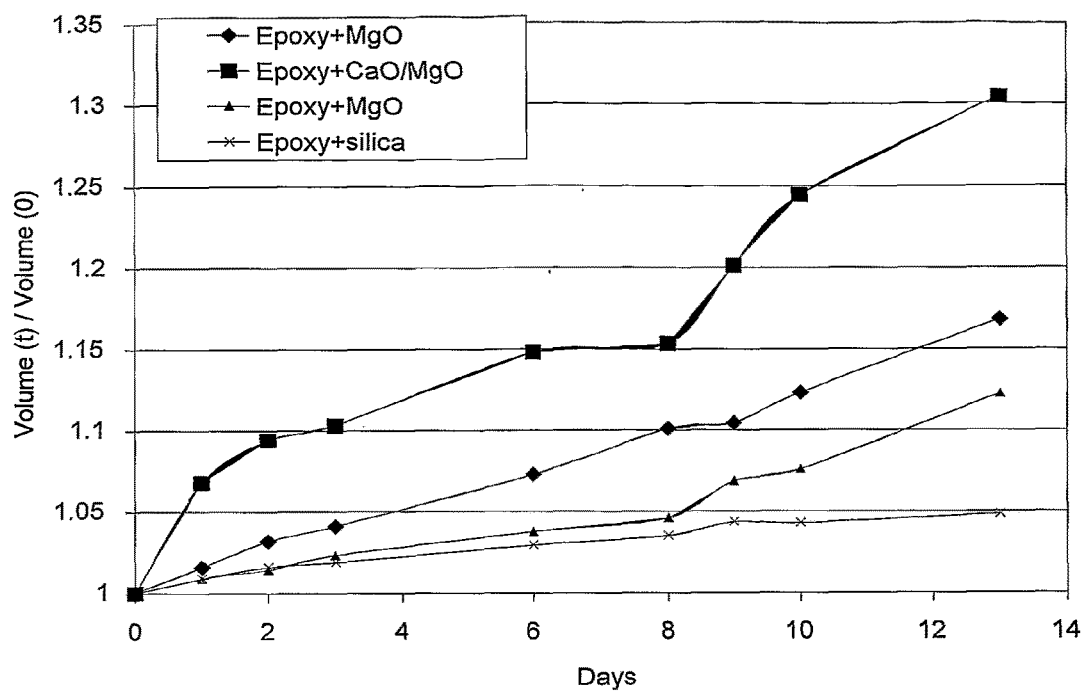
FIG. 5 shows the ratio of the volume at time (t) to the volume at start of a thermoset resin and MgO and a combination of both CaO and MgO.

The results of the measurements are shown on FIG. 5. The ratio of the volume at time (t) to the volume at the start is shown. It is clear that the system containing CaO/MgO provides an early increase of volume. The samples containing MgO show a much lower expansion than the CaO/MgO sample—this is likely due to the fact that higher temperatures are required to hydrate MgO than Cao. The MgO expansion is similar to that of the control sample (silica) at 60° C. To determine whether an increase in exposure temperature would increase the expansion of the MgO based samples, the 4 samples were placed in water in an oven at 85° C. after 8 days exposure at 60° C. As apparent, increasing the temperature increases the speed of reaction and thus expansion is achieved with all the systems according to the present invention.

The invention claimed is:

1. A swellable composition, suitable for use in subterranean wells, comprising an inorganic material dispersed within a polymer matrix, wherein the inorganic material swells on contact with water due to hydration and phase modification of the inorganic material, and wherein the polymer matrix comprises polyetheretherketone, polyaryletherketones, polyamides (Nylon 6, Nylon 6,6, Nylon 6,12, Nylon 12, Nylon 11), polycarbonate, polystyrene, polyphenylsulphone, polyphenylene sulphide, polysulphone, polytetrafluoroethylene, epoxy resins, furan resins, acrylonitrile-butadiene rubber, hydrogenated acrylonitrile-butadiene rubber and ethylene propylene diene M-class rubber and mixtures thereof.

2. The composition as claimed in claim 1, wherein the inorganic material is a metal oxide.

3. The composition as claimed in claim 1, wherein the inorganic material comprises magnesium oxide or calcium oxide and mixtures thereof.

4. The composition as claimed in claim 1, wherein the polymer matrix comprises a thermoplastic or thermoset material.

5. The composition as in claim 1, wherein the polymer matrix does not swell on contact with water, hydrocarbons or both.

6. The composition as in claim 1, wherein the polymer matrix swells on contact with water, hydrocarbons or both.

7. A method of treating an apparatus for installation in a borehole, comprising: applying a coating of a swellable composition comprising inorganic material dispersed within a polymer matrix, wherein the inorganic material swells on contact with water due to hydration and phase modification of the inorganic material to surfaces, of the apparatus, that can potentially contact water or other borehole fluids when installed, and wherein the polymer matrix comprises polyetheretherketone, polyaryletherketones, polyamides (Nylon 6, Nylon 6,6, Nylon 6,12, Nylon 12, Nylon 11), polycarbonate, polystyrene, polyphenylsulphone, polyphenylene sulphide, polysulphone, polytetrafluoroethylene, epoxy resins, furan resins, acrylonitrile-butadiene rubber, hydrogenated acrylonitrile-butadiene rubber and ethylene propylene diene M-class rubber and mixtures thereof.

8. The method as claimed in claim 7, comprising applying multiple layers of the composition to form a coating onto the apparatus.

9. The method as claimed in claim 7, whereby the apparatus comprises a casing, an inflatable packer, an external casing packer or a screen.

10. A method for manufacturing swellable compositions suitable for use in subterranean wells, comprising: dispersing a swellable inorganic material within a polymer matrix comprises polyetheretherketone, polyaryletherketones, polyamides (Nylon 6, Nylon 6,6, Nylon 6,12, Nylon 12, Nylon 11), polycarbonate, polystyrene, polyphenylsulphone, polyphenylene sulphide, polysulphone, polytetrafluoroethylene, epoxy resins, furan resins, acrylonitrile-butadiene rubber, hydrogenated acrylonitrile-butadiene rubber and ethylene propylene diene M-class rubber and mixtures thereof.

11. The method of claim 10, wherein the inorganic material is in particulate form when blended with the polymer.

12. The method of claim 11 wherein the blending is performed using an extrusion method, batch processing, or a continuous stirred tank reactor.

13. The method of claim 10, wherein the particles of inorganic material are surface-treated prior to blending with the polymer to improve bonding to and dispersion within the polymer.

14. The method of claim 10, wherein the inorganic material swells on contact with water due to hydration and phase modification of the inorganic material.

15. The method of claim 10, wherein the inorganic material comprises a metal oxide.

16. The method of claim 15, wherein the metal oxide comprises magnesium oxide or calcium oxide and mixtures thereof.

17. The method of claim 10, wherein the polymer matrix comprises a thermoplastic or a thermoset material.

18. The method of claim 10, wherein the polymer matrix does not swell on contact with water, hydrocarbons or both.

19. The method of claim 10, wherein the polymer matrix swells on contact with water, hydrocarbons or both.

* * * * *